(12) United States Patent
Suzuki

(10) Patent No.: US 6,836,747 B2
(45) Date of Patent: Dec. 28, 2004

(54) MEASURED DATA SYNCHRONIZATION SYSTEM

(75) Inventor: Takeyoshi Suzuki, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 0 days.

(21) Appl. No.: 10/637,597

(22) Filed: Aug. 11, 2003

(65) Prior Publication Data

US 2004/0167745 A1 Aug. 26, 2004

(30) Foreign Application Priority Data

Feb. 25, 2003 (JP) ........................................ 2003-046870

(51) Int. Cl.[7] .............................................. G04F 61/00
(52) U.S. Cl. ........................ 702/178; 702/125; 713/400
(58) Field of Search ................................ 702/178, 125; 713/400

(56) References Cited

U.S. PATENT DOCUMENTS

| | | | | |
|---|---|---|---|---|
| 4,135,181 A | * | 1/1979 | Bogacki et al. | ........ 340/310.01 |
| 5,428,645 A | * | 6/1995 | Dolev et al. | ................. 375/354 |
| 5,579,513 A | * | 11/1996 | Strohmer | .................... 713/600 |
| 6,199,169 B1 | * | 3/2001 | Voth | ........................... 713/400 |
| 2003/0158682 A1 | * | 8/2003 | Tanizume | ................... 702/89 |

FOREIGN PATENT DOCUMENTS

JP          11-355256          12/1999

* cited by examiner

*Primary Examiner*—John Barlow
*Assistant Examiner*—Anthony T. Dougherty
(74) *Attorney, Agent, or Firm*—Westerman, Hattori, Daniels & Adrian, LLP

(57) ABSTRACT

The present invention is to a measured data synchronization system having measuring instruments for measuring objects and outputting measured data, and a data processing apparatus connected to the measuring instruments via a signal line and which acquires and processes the measured data. The system relates to a measured data synchronization system which performs data processing using measured data for which synchronization among measuring instruments is ensured. The measuring instruments are given an input of reference times from the data processing apparatus and append these reference times to the measured data before outputting the data. The data processing apparatus outputs the reference times at prescribed intervals to each of the measuring instruments; receives an input of the measured data appended with the reference times from each of the measuring instruments; and performs data processing using measured data appended with desired reference times.

7 Claims, 7 Drawing Sheets

US 6,836,747 B2

MEASURED DATA SYNCHRONIZATION SYSTEM

BACKGROUND OF THE INVENTION

1. Field of the Invention

The present invention relates to a measured data synchronization system comprising a plurality of measuring instruments (for example, measuring devices and sensors) for measuring objects under measurement and outputting measured data, and a data processing apparatus connected to the plurality of measuring instruments via a signal line and which acquires and processes the measured data output by the measuring instruments. More specifically, the present invention relates to a measured data synchronization system which performs data processing using measured data for which synchronization among measuring instruments is ensured.

2. Description of the Prior Art

If a plurality of measuring instruments are used for measurement and measured data is acquired from these measuring instruments for data processing, it is necessary to ensure the synchronization of measurement results among the measuring instruments. A measured data synchronization system is intended to ensure the synchronization of measured data before data processing. Traditionally, there have been various kinds of systems for ensuring synchronization (for example, refer to the Japanese Laid-open Patent Application 1999-355256).

FIG. 1 illustrates an example of prior art measured data synchronization systems. In FIG. 1, data processing apparatus 10 is a computer or the like and is connected to general-purpose signal line 100. Measuring devices 2A to 2C are measuring instruments, have clocks 21 and synchronization circuits 22, and are connected to general-purpose signal line 100. Clock 21 outputs times. Synchronization circuit 22 is connected to clock 21, as well as to the synchronization circuits 22 of mutually adjacent measuring devices 2A to 2C via dedicated signal lines 200. General-purpose signal line 100 is, for example, an Ethernet (registered trademark). Dedicated signal line 200 is less susceptible to signal deterioration and reliably transmits signals.

Behaviors of such a system as mentioned above are explained here.

First, the behavior of achieving synchronization among the clocks 21 of measuring devices 2A to 2C is explained. Of the clocks 21 of measuring devices 2A to 2C, the clock 21 of the measuring device 2A, for example, is defined as the reference clock. The synchronization circuit 22 of measuring device 2A acquires times from clock 21 and outputs the acquired time as a synchronization signal to the synchronization circuit 22 of measuring device 2B via the dedicated signal line 200. When given an input of the synchronization signal from measuring device 2A, the synchronization circuit 22 of measuring device 2B immediately outputs this synchronization signal to the synchronization circuit 22 of measuring device 2C via dedicated signal line 200. Then, according to the time contained in the synchronization signal, the synchronization circuits 22 of measuring devices 2B and 2C synchronize their respective clocks 21 with the clock 21 of measuring device 2A. Synchronization circuits 22 perform these behaviors as frequently as possible to achieve synchronization.

Next, behaviors wherein measuring devices 2A to 2C perform measurements and data processing apparatus 10 processes data are explained. Data processing apparatus 10 outputs a start measurement command towards measuring devices 2A to 2C via general-purpose signal line 100, thereby enabling measuring devices 2A to 2C to perform measurements. When measurement is completed, measuring devices 2A to 2C append the time of synchronized clocks 21 to the measured data and output the measured data containing the time towards data processing apparatus 10 via general-purpose signal line 100. Moreover, the data processing apparatus uses the measured data and the time contained therein to achieve synchronization among measuring device 2A to 2C before performing data processing.

Another example of prior art systems is explained by referring to FIG. 2.

Note that elements identical to those of FIG. 1 are referenced alike and excluded from the description. In FIG. 2, data processing apparatus 11 is provided in place of data processing apparatus 10. Data processing apparatus 11 has clock 12 and is connected to general-purpose signal line 100. In addition, measuring devices 3A to 3C are provided in place of measuring devices 2A to 2C. Measuring devices 3A to 3C are connected to general-purpose signal line 100.

Behaviors of such a system as mentioned above are explained below. Data processing apparatus 11 outputs a start measurement command to measuring devices 3A to 3C via general-purpose signal line 100, and also retains the time of clock 12 when the command is output. Then, measuring devices 3A to 3C perform measurements according to the start measurement command from data processing apparatus 11. When measurement is completed, the measuring devices output measured data to data processing apparatus 11 via general-purpose signal line 100. Data processing apparatus 11 processes the measured data sent from measuring devices 3A to 3C, assuming that the measured data was acquired at the point of time that the apparatus retains. This type of system configuration is generally referred to as SCADA (Supervisory Control and Data Acquisition).

As described above, the system shown in FIG. 1 ensures synchronization in such a way that synchronization circuits 22 adjust the times of clocks 21 to each other via dedicated signal lines 200. However, each of measuring devices 2A to 2C requires a clock 21 and synchronization circuit 22. Moreover, dedicated signal lines are required to connect synchronization circuits 22. Synchronization circuits 22 require complicated processing (for example, compensation for the time delays of synchronization signals resulting from the lengths of dedicated signal lines 200 or reconstruction of deteriorated waveforms) to achieve synchronization. In addition, dedicated signal line 200 tends to be more expensive than general-purpose signal line 100 because the dedicated signal line is specifically designed to reliably send synchronization signals. In addition, if a dedicated signal Line is extended due to an increase in the number of measuring devices including 2A to 2C or for reasons of the locations where measuring devices 2A to 2C are installed, the waveforms of synchronization signals may deteriorate or the delay time may be prolonged, thereby significantly increasing synchronization errors among measuring devices 2A to 2C. These factors restrict the number of measuring devices, including 2A to 2C, that can be connected or the locations where these measuring devices can be installed.

On the other hand, systems such as the SCADA system shown in FIG. 2 do not achieve synchronization among measuring devices 3A to 3C but use, as a reference, the time when data processing apparatus 11 outputs a command. However, the time required for measuring devices 3A to 3C to acquire measured data or the communication delay involved in data transmission generally differs among measuring devices 3A to 3C: these effects would result in synchronization errors. Needless to say, the synchronization errors become larger as the number of measuring devices including 3A to 3C increases, or depending on the locations where measuring devices 3A to 3C are installed. It becomes especially difficult to synchronize measured data if the sampling frequency is made higher, causing the measurement interval to become shorter.

SUMMARY OF THE INVENTION

An object of the present invention is to realize a measured data synchronization system wherein data processing is performed using measured data for which synchronization among measuring instruments is ensured.

DETAILED DESCRIPTION OF THE PREFERRED EMBODIMENTS

Preferred embodiments are described in detail below by referring to the accompanying drawings.

Figure 1:
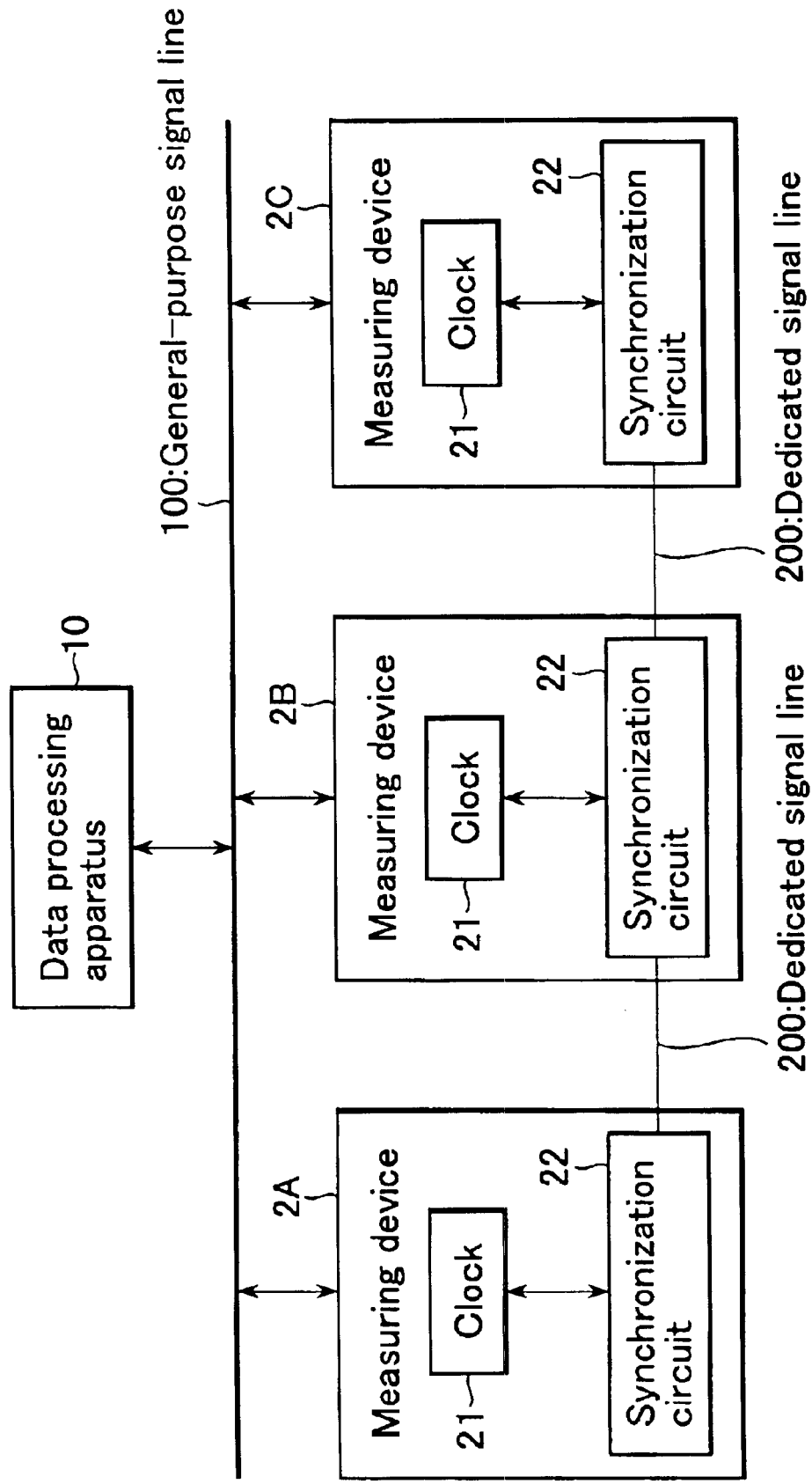
FIG. 1 is a first schematic view of a prior art multi-point data acquisition system.
Figure 3:
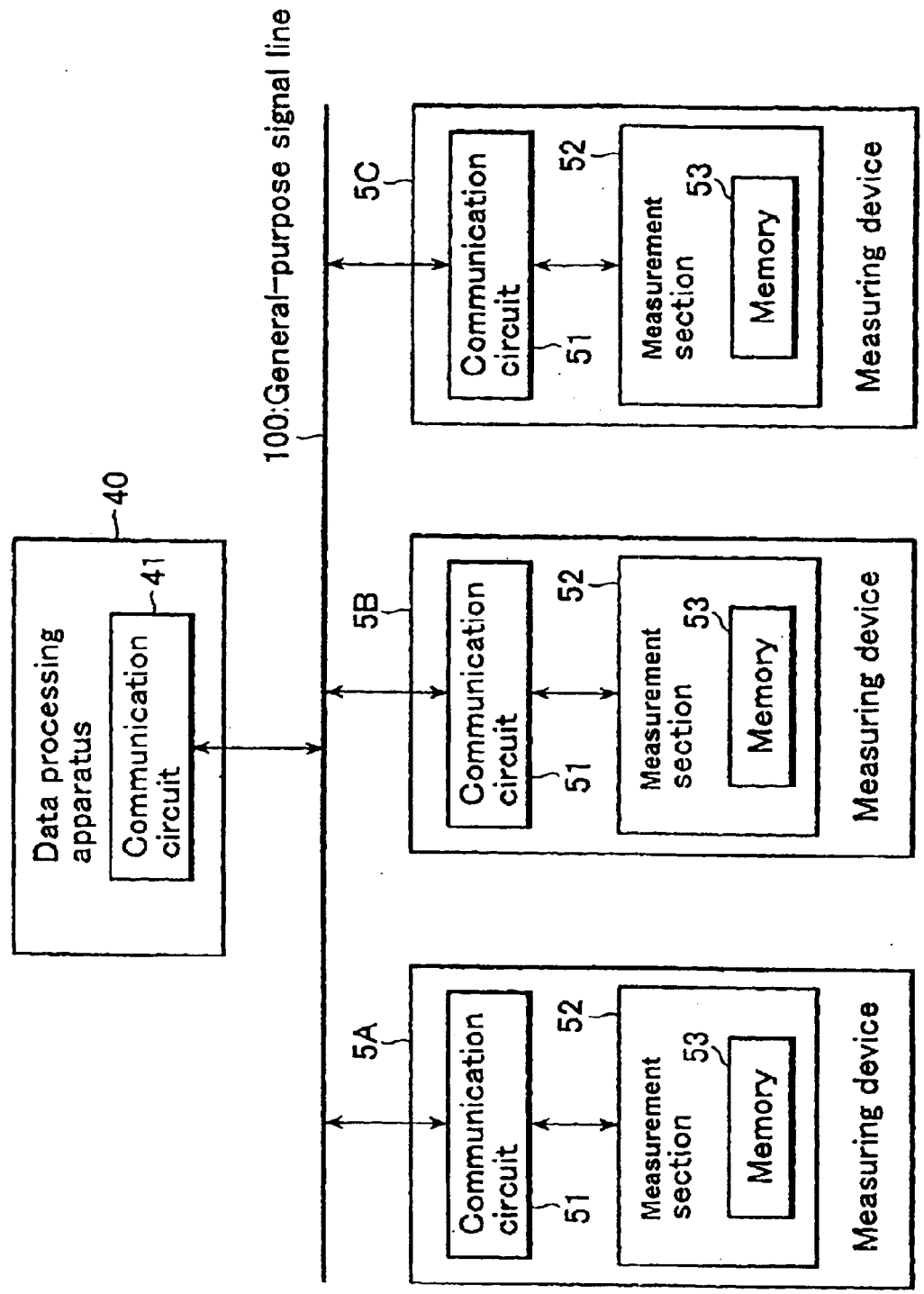
FIG. 3 is a schematic view showing an embodiment of the present invention.

FIG. 3 is a schematic view showing an embodiment of the present invention. Elements identical to those of FIG. 1 are referenced alike and excluded from the description. In FIG. 3, data processing apparatus 40 is, for example, a computer and is connected to general-purpose signal line 100. Data processing apparatus 40 has communication circuit 41. This communication circuit 41 is connected to general-purpose signal line 100 to exchange signals therewith.

Measuring devices 5A to 5C are measuring instruments, contain communication circuits 51 and measurement sections 52, and are connected to general-purpose signal line 100. Communication circuit 51 is connected to general-purpose signal line 100 to exchange signals therewith. Measurement section 52 has time value memory 53, which stores reference times output from communication circuit 51. In addition, measurement section 52 measures objects under measurement according to setup conditions and/or commands, appends the reference time stored in time value memory 53 to measured data, and outputs the measured data to communication circuit 51.

Figure 4:
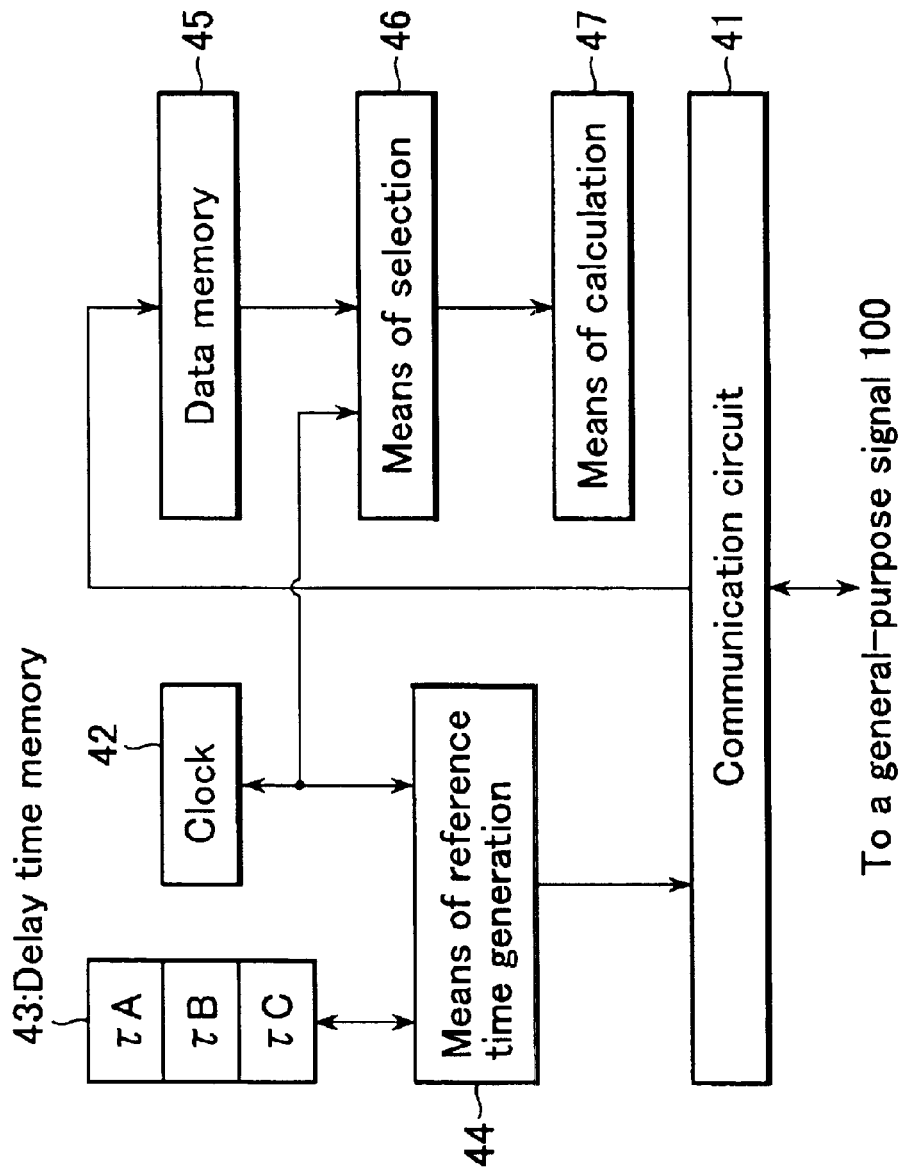
FIG. 4 is a detailed configuration diagram of the data processing apparatus 40 in the system shown in FIG. 3.

Next, a specific system configuration is explained. FIG. 4 is a configuration diagram of data processing apparatus 40. In FIG. 4, real-time clock 42 is a means of time output and outputs the current time. Delay time memory 43 is a first means of memory and stores communication delay times that are required for data transmission between data processing apparatus 40 and each of measuring devices 5A to 5C. Here, the communication delay times between data processing apparatus 40 and each of measuring devices 5A to 5C are defined as τA, τB and τC, respectively. Communication delay times τA to τC are calculated from the quantity of packets which are communicated on general-purpose signal line 100. Alternatively, communication delay times τA to τC are determined by transmitting test packets from data processing apparatus 40 to measuring devices 5A to 5C, thus actually measuring the time taken until responses to the test packets are returned from measuring devices 5A to 5C, more than once, then averaging these times.

Means of reference time generation 44 corrects the times output from clock 42 using communication delay times τA to τC that are read from delay time memory 43, and outputs the corrected times as reference times to communication circuit 41.

Data memory 45 is a means for storing data and stores data that is sent from communication circuit 41 (i.e., measured data appended with the reference times and the names of measuring devices 5A to 5C that have output the measured data). Means of selection 46 reads data from data memory 45, selects from the read data items according to the times sent from clock 42, and outputs the selected data items. Means of calculation 47 performs desired data processing upon the data that means of selection 46 has selected and output.

Behaviors of the systems shown in FIGS. 3 and 4 are described below. Data processing apparatus 40 outputs setup conditions used for measurement (such as measurement intervals and measurement ranges) and outputs signals consisting of commands, such as a start measurement command and an end measurement command, to measuring devices 5A to 5C in sequence. These signals, together with the reference times generated from means of reference time generation 44, are converted by communication circuit 41 into communication signals (packets, which means blocks of data), and are output to general-purpose signal line 100.

Reference times mean the times which are obtained by adding the communication delay times τA to τC of respective measuring devices 5A to 5C to the times output from clock 42. For example, if the current time is t1, the reference time for measuring device 5A is (reference time t1+communication delay time τA).

Even if data processing apparatus 40 does not output signals, such as setup conditions and commands, it is preferable that data processing apparatus 40 include reference times from means of reference time generation 44 in packets and output the packets at desired measurement intervals shorter than those of measuring devices 5A to 5C. For example, assuming that the measurement interval of measuring device 5A is Δt, packets should be output to measuring device 5A at a measurement interval of Δt/2 to Δt/10. Preferably, the resolution of reference times should be, for example, 1, which is approximately Δt/10 if the measurement interval Δt=10; that is, "hh hours, mm minutes, ss seconds, xxx."

On the other hand, packets are input from data processing apparatus 40 to the communication circuits 51 of measuring devices 5A to 5C via general-purpose signal line 100. Then, communication circuits 51 select desired signals (such as setup conditions, commands, and reference times) from the packets. Measurement sections 52 store reference times out of signals output from communication circuits 51 in time value memories 53. Measurement sections 52 provide settings according to the setup conditions, start measurements according to the start measurement command, append reference times stored in time value memories 53 to measured data, and output the measured data to communication circuits 51. Then, communication circuits 51 output measured data including reference times to the communication circuit 41 of data processing apparatus 40 via general-purpose signal line 100. As a result, the communication circuit 41 of data processing apparatus 40 extracts data from packets and stores the data in data memory 45.

Figure 5:
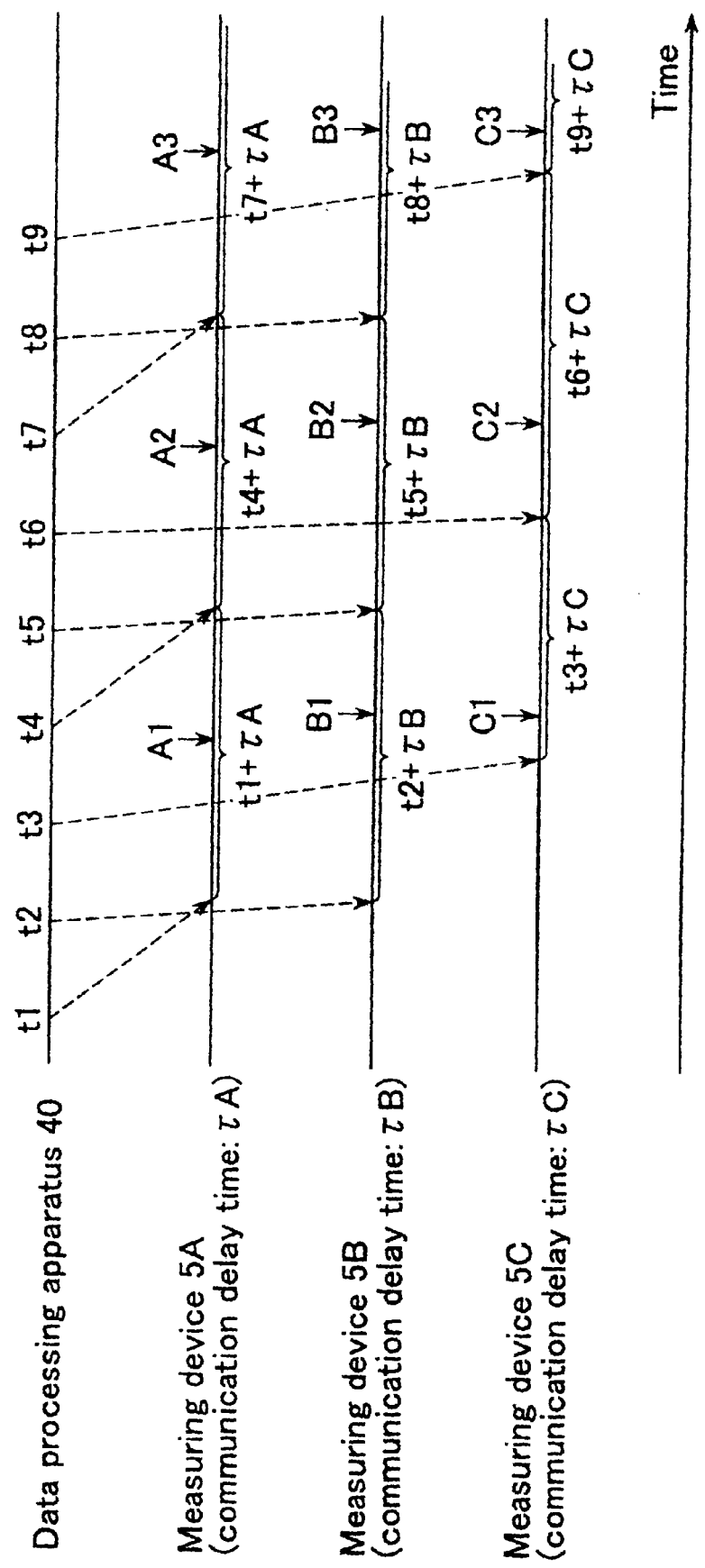
FIG. 5 is a timing chart explaining examples of the behaviors of the systems shown in FIGS. 3 and 4.

Here, by referring to FIG. 5, a specific example of behaviors in which data processing apparatus 40 outputs reference times, measuring devices 5A to 5C perform measurements and acquire measured data, and the measured data is stored in data memory 45 is explained. FIG. 5 is a timing chart illustrating the behaviors of data processing apparatus 40 and measuring devices 5A to 5C. FIG. 5 shows, from the top down, the behaviors of data processing apparatus 40, measuring device 5A, measuring device 5B and measuring device 5C. The horizontal axis represents time. To simplify the explanation, data processing apparatus 40 outputs packets including reference times to each of measuring devices 5A to 5C at almost the same measuring intervals as those of measuring devices 5A to 5C.

First, behaviors of data processing apparatus 40 are explained.

Data processing apparatus 40 outputs reference times to measuring devices 5A to 5C in sequence at a given interval. That is, data processing apparatus 40 adds a communication delay time τA to times t1, t4 and t7 and outputs them as reference times to measuring device 5A; adds communication delay time τB to times t2, t5 and t8 and outputs them as reference times to measuring device 53; and adds communication delay time τC to times t3, t6 and t9 and outputs them as reference times to the measuring device 5C. Although FIG. 5 provides illustrations only up to time t9, data processing apparatus 40 also continues to output reference times after this time t9 until a desired time is reached.

Next, behaviors of the measuring devices 5A to 5C are explained.

When the reference time (t1+τA) output from data processing apparatus 40 at time t1 is input to measuring device 5A, the measurement section 52 of measuring device 5A stores the reference time (t1+τA) in time value memory 53. Similarly, when the reference time (t4+τA) output at time t4 is input to measuring device 5A, the reference time (t4+τA) is newly stored in time value memory 53. Then, when the reference time (t7+τA) output at time t7 is input to measuring device 5A, the reference time (t7+τA) is newly stored in time value memory 53.

Similarly, when the reference times (t2+τB), (t5+τB) and (t8+τB) output from the data processing apparatus at t2, t5, and t8 respectively are input to measuring device 5B, the measurement section 52 of measuring device 5B stores these reference times in time value memory 53. Also similarly, when the reference times (t3+τC), (t6+τC) and (t9+τC) output from the data processing apparatus at t3, t6, and t9 respectively are input to measuring device 5C, the measurement section 52 of measuring device 5C stores these reference times in time value memory 53.

Note that, even if reference times output at given intervals from data processing apparatus 40 reach measuring devices 5A to 5C at uneven intervals (for example, reference times (t3+τC) and (t6+τC) in FIG. 5) due to the communication conditions of general-purpose signal line 100, measurement section 52 stores the latest input reference time in time value memory 53.

Here, it is assumed that the measurement section 52 of measuring device 5A acquires measured data A1 during the time from the entry of the reference time (t1+τA) until the entry of the next reference time (t4+τA), that is, during the time while the time value memory 53 of measuring device 5A is storing the reference time (t1+τA). Then, while time value memory 53 is storing the reference times (t4+τA) and (t7+τA), measurement section 52 acquires measured data A2 and A3, respectively.

Similarly, while time value memory 53 is storing (t2+tτB), (t5+τB) and (t8+τB), the measurement section 52 of measuring device 5B acquires measured data B1, B2 and B3, respectively. While time value memory 53 is storing (t3+τC), (t6+τC) and (t9+τC), the measurement section 52 of measuring device 5B acquires measured data C1, C2 and C3, respectively.

Then, upon acquiring measured data A1, the measurement section 52 of measuring device 5A appends the reference time (t1+τA) being stored by time value memory 53 to measured data A1, and immediately outputs measured data A1 to communication circuit 51. Similarly, the measurement section 52 of measuring device 5A appends the reference times (t4+τA) and (t7+τA) to measured data A2 and A3, and outputs these measured data to communication circuit 51. In addition, upon acquiring measured data B1, B2, B3, C1, C2 and C3, the measurement sections 52 of measuring devices 5B and 5C append the reference times (t2+τB), (t5+τB), (t8+τB), (t3–τC), (t6+τC) and (t9+τC), to these measured data and immediately output the data to communication circuits 51. As a result, communication circuits 51 output the measured data, including the appended reference times, in the form of packets to data processing apparatus 40 via general-purpose signal line 100. Then, the communication circuit 41 of data processing apparatus 40 extracts measured data A1 to A3, B1 to B3, and C1 to C3, all of which include reference times, from the packets output from measuring devices 5A to 5C respectively, and stores the measured data in data memory 45.

Figure 6:
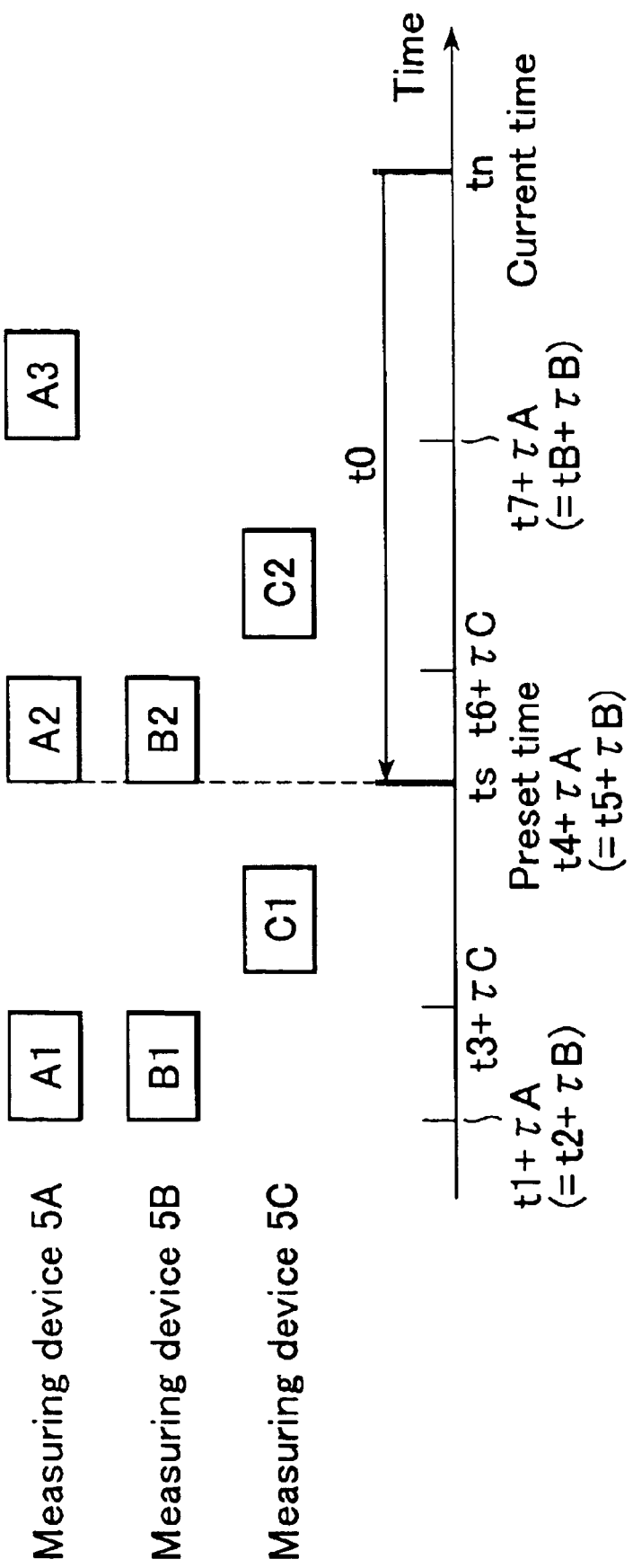
FIG. 6 is a first schematic view illustrating an example of the behaviors of the means of selection 46 shown in the systems of FIGS. 3 and 4.

Next, by referring to FIG. 6, a specific example of data processing behaviors in which data processing apparatus 40 processes measured data A1 to A3, B1 to B3, and C1 to C3 is explained. Note that elements identical to those of FIG. 5 are referenced alike and excluded from the description. FIG. 6 illustrates the behaviors of the means of selection 46 of data processing apparatus 40. In FIG. 6, the measured data of measuring devices 5A, 5B, and 5C are graphically indicated from the top down, with reference to the time axis. The horizontal axis represents time. Here, it should be understood that when the current time tn is input from clock 42, means of selection 46 stores measured data A1 to A3, B1 to B2, and C1 to C2 in data memory 45. In addition, it is assumed that the reference time (t1+τA)=(t2+τB) and (t4+τA)=(t5+τB), and (t3+τC)<preset time ts<(t6+τC)

The means of selection 46 of data processing apparatus 40 specifies the time ts (for example, time (t4+τA)) as the preset time, which is the time t0 earlier than the current time tn input from clock 42. Time t0, which precedes the current time tn, is set in advance according to the communication delay times τA, τB, and τC of delay time memory 43 and the measurement times and measurement intervals of measuring devices 5A to 5C. For example, time t0 may be the sum of all these times.

Then, the means of selection 46 selects measured data A2 and B2 appended with the reference times (t4+τA) and (t5+τB) which are the same as the preset time ts, and outputs the data to the means of calculation 47. If data appended with the same reference times as the preset time ts does not exist, in other words, if the reference times (t3+τC) and (t6+τC) which have been appended to measured data C1 and C2 sent from measuring device 5C do not agree with the preset time ts, the means of selection 46 applies interpolation (for example, primary or secondary approximation) according to measured data C1 and C2 at the reference times (t3+τC) and (t6+τC) before and after the preset time ts, and outputs the interpolated measurement data to the means of calculation 47.

Then, the means of calculation 47 uses measured data A2 and B2 and the interpolated measured data output from the means of selection 46 to perform data processing. Moreover, results of data processing performed by the means of calculation 47 are indicated on the display processing apparatus which is not illustrated here.

Thus, data processing apparatus 40 outputs reference times output from the means of reference time generation 44 to measuring devices 5A to 5C. The means of selection 46 outputs to the means of calculation 47, those measured data whose reference times are the same as the preset time ts or those measured data which have been interpolated using measured data whose reference times are close to the preset time ts, among the measured data items to which reference times output from each of measuring devices 5A to 5C are appended. Then, the means of calculation 47 performs data processing. Consequently, it is possible to perform data processing using synchronized measurement data without being constrained by the number of measuring devices including measuring devices 5A to 5C, or by the locations where the measuring devices are installed.

In other words, unlike the system shown in FIG. 1, the system of the above-described embodiment can perform data processing using measured data synchronized among measuring devices 5A to 5C, even if clocks 21, synchronization circuits 22 and dedicated signal lines 200 are not present. In addition, the system is immune to synchronization errors due to the lengths of dedicated signal lines 200. Consequently, it is possible to perform data processing using synchronized measurement data without being constrained by the number of measuring devices including measuring devices 5A to 5C, or by the locations where the measuring devices are installed. Moreover, it is possible to suppress costs and reduce the burden of measuring devices 5A to 5C.

Figure 2:
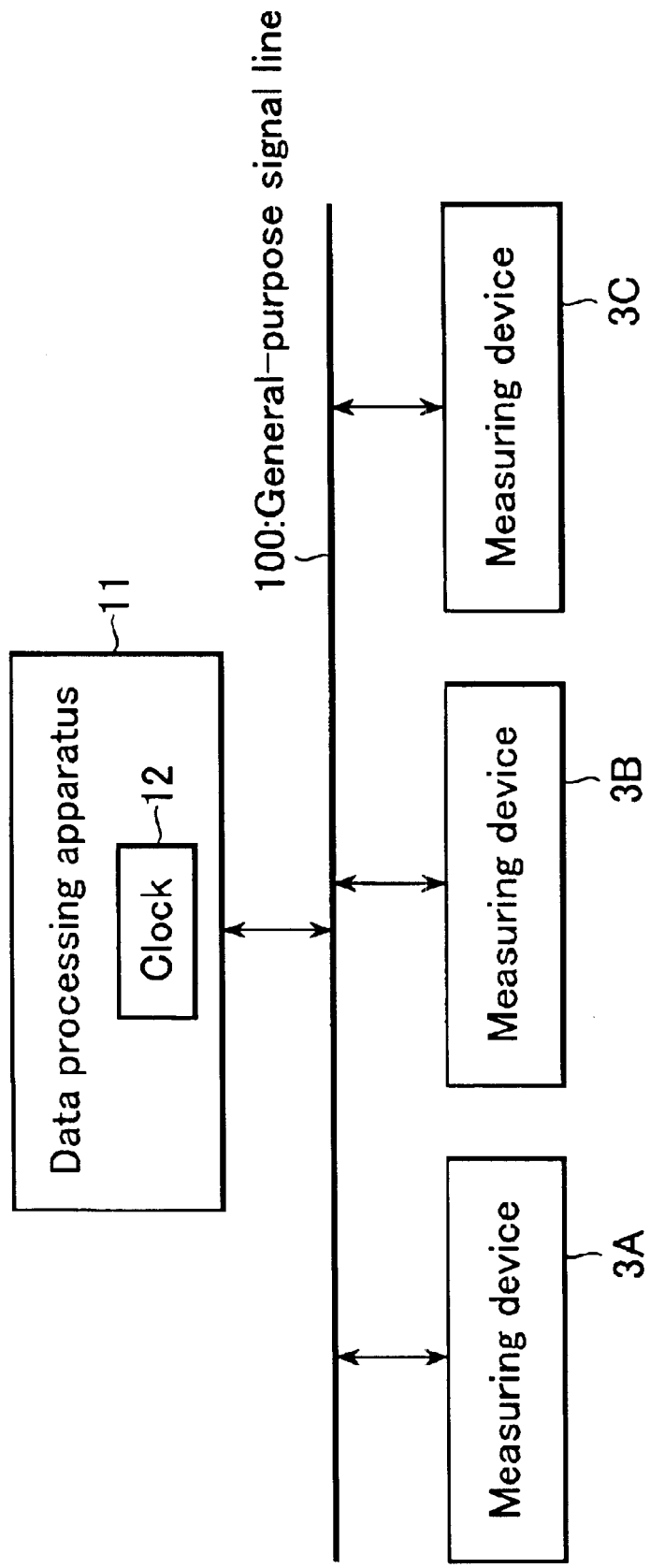
FIG. 2 is a second schematic view of a prior art multi-point data acquisition system.

Similarly, even if the sampling frequency is higher and the measurement interval is shorter than those of the system shown in FIG. 2, or even if the sampling frequency differs among measuring devices 5A to 5C, it is possible to perform data processing using measured data synchronized among measuring devices 5A to 5C. Moreover, the system of the above-described embodiment is immune to the effects of difference in the time required for data transfer that is caused by an increase in the number of measuring devices including 5A to 5C or by the locations where measuring devices 5A to 5C are installed. Consequently, it is possible to perform data processing using synchronized measured data without being constrained by the number of measuring devices including measuring devices 5A to 5C, or by the locations where the measuring devices are installed.

Moreover, since the means of selection 46 outputs those measured data whose reference times are the same as the preset time ts or those measured data which have been interpolated using measured data whose reference times are close to the preset time ts, the number of measured data for use in selection or interpolation is low. In other words, not all of the measured data stored in data memory 45 but only the measured data appended with reference times close to the preset time ts are used. This makes it possible to reduce the burden of the means of selection 46 and to output measured data to the means of calculation at higher speeds.

The present invention is not limited to the above-described embodiment but may be embodied in the following manners:

(1) In the above-described embodiment, a system configuration is shown in which the means of selection 46 outputs to the means of calculation 47, those measured data whose reference times are the same as the preset time ts or those measured data which have been interpolated using measured data whose reference times are close to the preset time ts, among the measured data appended with reference times output from each of measuring devices 5A to 5C. Alternatively, if the measured data sent from the same measuring device, for example, measuring device 5A, contains a plurality of data items appended with the same reference time, measured data can be selected and output according to the difference between this reference time and the next reference time and to the number of measured data appended with the same reference time.

Figure 7:
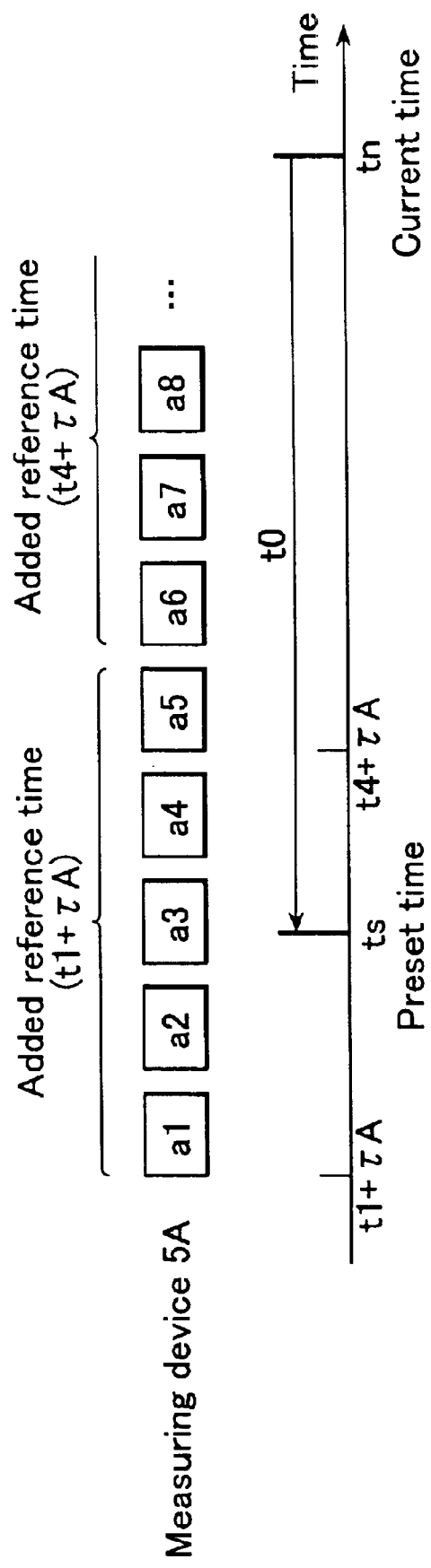
FIG. 7 is a second schematic view illustrating an example of the behaviors of the means of selection 46 shown in the systems of FIGS. 3 and 4.

The alternative system configuration discussed above is described with reference to FIG. 7. FIG. 7 illustrates behaviors of the means of section 46. Note that elements identical to those of FIG. 6 are referenced alike and excluded from the description. In FIG. 7, the measured data of measuring device 5A is graphically indicated with reference to the time axis. The horizontal axis represents time. Here, it should be understood that measured data a1 to a5 appended with the reference time (t1+τA) and measured data a6 to a8 appended with the reference time (t4+τA) are stored in data memory 45. The preset time tx is set so as to satisfy (t1+τA<tx<t4+τA). The means of selection 46 determines the difference between the reference times (t1+τA) and (t4+τA). It also determines the number of measured data a1 to a5, selects measured data a4 that has a reference time closest to the preset time tx and outputs the data to the means of calculation 47.

For example, assuming that the reference time (t1+τA) is 10 hours:00 minutes:00 seconds, the reference time (t4+τA) is 10 hours:00 minutes:00 seconds, and preset time tx is 10 hours:00 minutes:03 seconds, then the means of selection 46 selects measured data a4. Consequently, it is possible to perform data processing using synchronized measured data even if the measurement intervals of measuring devices 5A to 5C are shorter than the interval between reference times output from data processing apparatus 40.

(2) In the above-described embodiment, another system configuration is shown in which measured data is selected according to the difference between this reference time and the next reference time and to the number of measured data items appended with the same reference time if the measured data sent from same measuring devices 5A to 5C, contains a plurality of data items appended with the same reference time, as illustrated in FIG. 7. Alternatively, the means of selection 46 may be provided with a means of error detection to measure errors in the measurement intervals of measurement sections 52 of measuring devices 5A to 5C. In other words, there is a case that even if the measurement intervals of measuring devices 5A to 5C are set to specific values, the measurement intervals may slightly differ from each other among measuring device 5A to 5C. In that case, it is possible that the means of error detection determines measurement interval errors among the measurement sections 52 of measuring devices 5A to 5C from the number of measured data items a1 to a5 included in the interval between reference times (t1+τA) and (t4+τA).

(3) In the above-described embodiment, yet another system configuration is shown in which the means of selection 46 applies interpolation according to measured data C1 and C2 and outputs the interpolated measured data. Since there is virtually no problem even if errors between the preset time ts and a reference time are ignored, provided that only marginal changes arise in measured data items C1 and C2 like in the case of, for example, temperature measurement, that the interval at which reference times are input is shorter than, for example, $\Delta t/10$ with reference to the measurement interval $\Delta t$, or that the interval at which the means of calculation 47 performs data processing is as long as 10 times the measurement interval $\Delta t$. Thus, alternatively, it is possible to select measured data C2 appended with the reference time (t6+$\tau$C) which is closest to the preset time ts and output the measured data to the means of calculation 47, without applying interpolation. Consequently, it is possible to reduce the burden of the means of selection 46 and select measured data at higher speeds.

(4) In the above-described embodiment, yet another system configuration is shown in which the means of selection 46 applies interpolation according to measured data C1 and C2 (for example, primary or secondary approximation) and outputs the interpolated measured data. Alternatively, it is possible to store computational expressions used for interpolation in a storage section which is not illustrated in the figure. Consequently, by reading the computational expressions from the storage section, it is possible to restore original measured data C1 and C2 or perform data processing again using other interpolation or synchronization methods.

(5) In the above-described embodiment, yet another system configuration is shown in which the means of selection 46 outputs to the means of calculation 47, those measured data whose reference times are the same as the preset time ts or those measured data which have been interpolated using measured data whose reference times are close to the preset time ts, among the measured data appended with reference times output from each of measuring devices 5A to 5C. Alternatively, it is possible to con-figure the system so that the means of selection 46 outputs only those measured data whose reference times are the same as the preset time ts.

(6) In the above-described embodiment, yet another system configuration is shown in which three measuring devices 5A to 5C are installed. Alternatively, it is possible to install as many measuring devices as desired.

According to the present invention, the following advantages are provided.

In one aspect of the present invention, the data processing apparatus outputs reference times to each of the measuring devices at prescribed intervals. The apparatus then performs data processing using only those measured data which are appended with the desired reference times, among the measured data appended with reference times and output from each of the measuring devices. Consequently, it is possible to perform data processing using synchronized measured data without being constrained by the number of measuring devices or by the locations where the measuring devices are installed.

In another aspect of the present invention, if measured data sent from the same measuring device contains a plurality of measured data appended with the same reference time, the means of selection selects and outputs those measured data whose reference times are closest to the preset time, according to the difference between that reference time and the next reference time and to the number of measured data appended with the same time reference. Consequently, it is possible to perform data processing using synchronized measured data even if the measurement interval of a measuring device is shorter than the interval at which reference times are output from the data processing apparatus.

In yet another aspect of the present invention, the means of selection specifies a time preceding the current time as the preset time and selects measured data from those which are appended with reference times close to the preset time. Consequently, the burden of the means of selection is reduced and measured data can be output to the means of calculation at higher speeds.

What is claimed is:

1. A measured data synchronization system, comprising:

a plurality of measuring instruments for measuring objects under measurement and outputting measured data; and a data processing apparatus connected to said plurality of measuring instruments via a signal line and which acquires and processes said measured data output by said measuring instruments;

wherein said measuring instruments are given an input of reference times from said data processing apparatus and append said reference times to said measured data before outputting said measured data, and said data processing apparatus outputs said reference times at prescribed intervals to each of said measuring instruments, receives an input of measured data appended with said reference times output from each of said measuring instruments, and performs data processing using measured data appended with desired reference times, and wherein said data processing apparatus comprises:

means of time output for outputting times;

first means of memory for storing a communication delay time required for data transmission for each of said measuring instruments; and means of reference time generation for outputting times, which are output by said means of time output and corrected by said first means of memory, as reference times.

2. The measured data synchronization system of claim 1, wherein said data processing apparatus comprises:

a communication circuit which receives an input of reference times from said means of reference time generation and exchanges signals with said plurality of measuring instruments via said signal line;

means of data memory for storing measured data appended with reference times sent from said plurality of measuring instruments and output by said communication circuit;

means of selection for reading said measured data appended with said reference times from said means of data memory and selecting and outputting measured data appended with desired reference times according to a time output by said means of time output; and means of calculation for performing desired data processing upon said measured data output by said means of selection.

3. The measured data synchronization system of claim 2, wherein said means of selection selects measured data appended with reference times which are the same as a preset time.

4. The measured data synchronization system of claim 3, wherein said means of selection selects and outputs those measured data appended with reference times closest to said preset time if measured data appended with the same reference times as said preset time does not exist.

5. The measured data synchronization system of claim 3, wherein said means of selection selects measured data appended with reference times before and after said preset time and applies interpolation if measured data appended with the same reference times as said preset time does not exist, and outputs interpolated measured data.

6. The measured data synchronization system of claim 3, wherein said means of selection selects and outputs measured data according to a difference between said reference time and the next reference time and to the number of measured data appended with the same reference time, if measured data sent from the same measuring instrument contains a plurality of measured data appended with the same reference time.

7. The measured data synchronization system of claim 3, 4, 5 or 6, wherein said means of selection specifies a time preceding a time output from said means of time output, according to the communication delay time of said first means of memory, the measurement times of said measuring instruments and the measurement intervals of said measuring instruments.

* * * * *